(No Model.) 2 Sheets—Sheet 1.
J. T. WILSON.
CAR COUPLING.
No. 389,181. Patented Sept. 4, 1888.
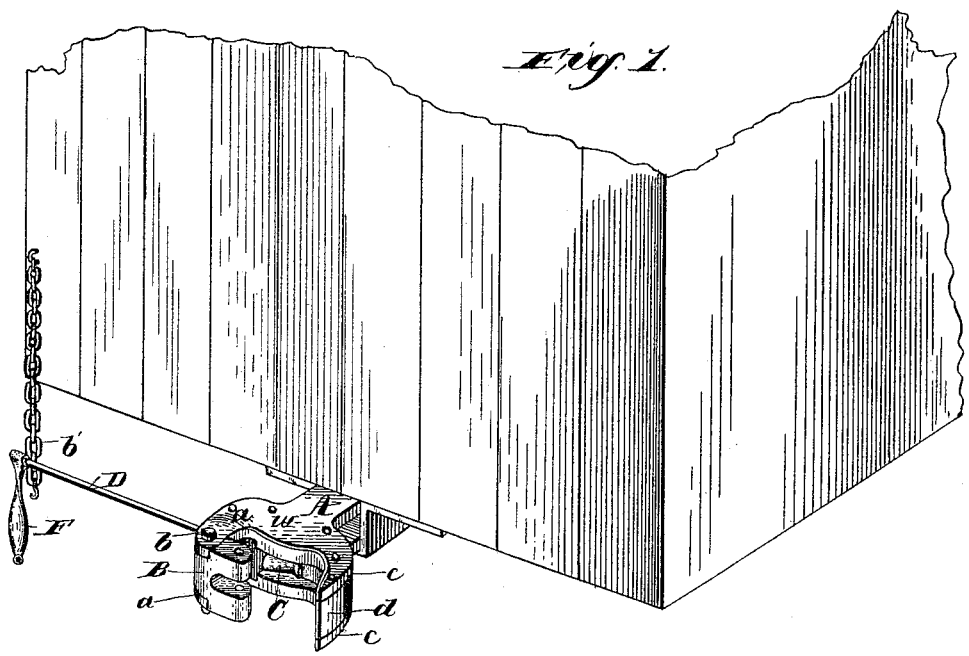
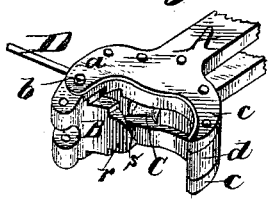
Witnesses,
Wm. H. Scott.
Wm. E. Dyre.
Inventor
John T. Wilson,
By Johnstone, Reinohl & Dyre,
Attorneys.

(No Model.) 2 Sheets—Sheet 2.
J. T. WILSON.
CAR COUPLING.
No. 389,181. Patented Sept. 4, 1888.
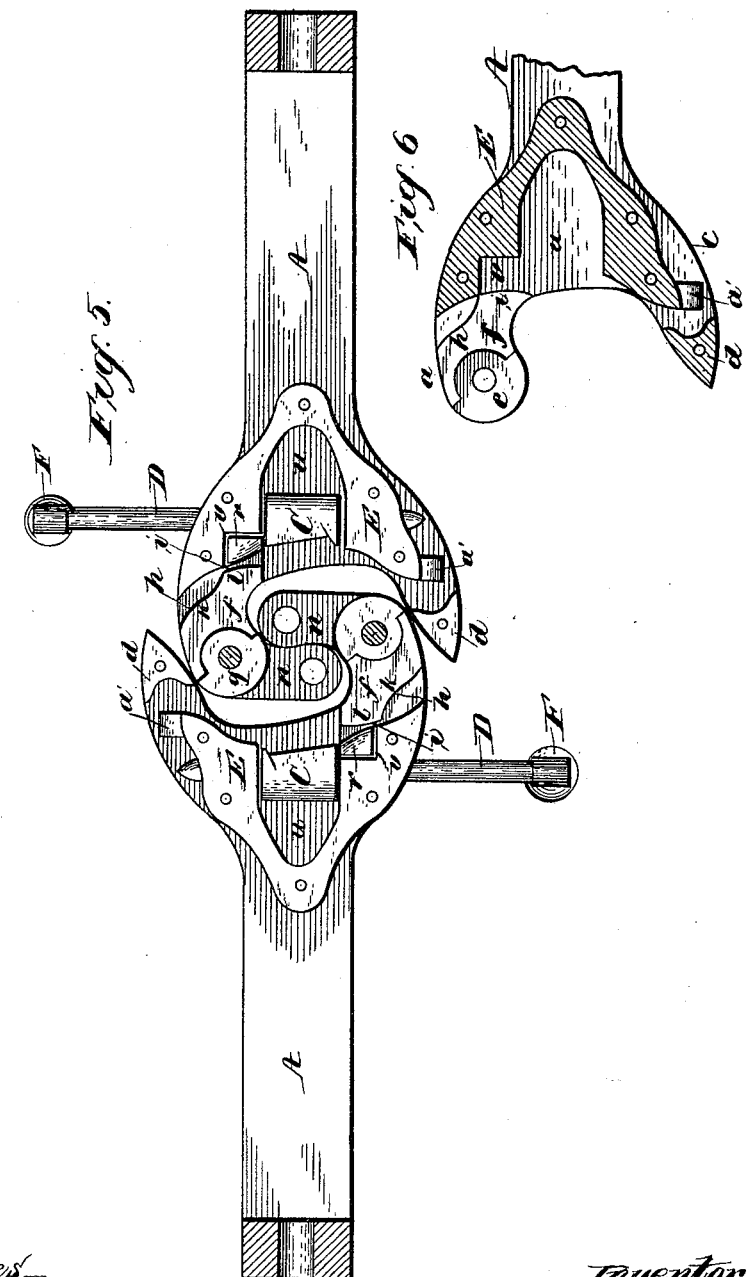

UNITED STATES PATENT OFFICE.

JOHN T. WILSON, OF PITTSBURG, PENNSYLVANIA, ASSIGNOR OF THREE-FOURTHS TO THE PITTSBURGH FORGE AND IRON COMPANY.

CAR-COUPLING.

SPECIFICATION forming part of Letters Patent No. 389,181, dated September 4, 1888.

Application filed June 1, 1888. Serial No. 275,694. (No model.)

*To all whom it may concern:*

Be it known that I, JOHN T. WILSON, a citizen of the United States, residing at Pittsburg, in the county of Allegheny and State of Pennsylvania, have invented certain new and useful Improvements in Car-Couplings; and I do hereby declare the following to be a full, clear, and exact description of the invention, such as will enable others skilled in the art to which it appertains to make and use the same.

My invention relates to car-couplings, and has for its object an improvement in that class of couplers which employ a rotary vertical hook.

The invention will be hereinafter described, and particularly pointed out in the claims.

In the accompanying drawings, which form part of this specification, Figure 1 is a perspective view showing my improved coupler attached to a car, the hook being in locked position. Figs. 2 and 3 are enlarged perspectives of the hook and the locking-cam attached. Fig. 4 is a similar view of a portion of a coupler, showing the hook open. Fig. 5 is a horizontal section with the upper side of the skeleton frame removed, showing two couplers locked; and Fig. 6 is a similar view of the head portion of one coupler with the hook removed.

Reference being had to the drawings and the letters marked thereon, A represents a forged skeleton-frame draw-bar, which is provided with arms *a*, to which the hook B is attached by a pin, *b*, and guard-arms *c*, between which a guard-block, *d*, is secured. The inner surfaces of the arms *a* are provided with rabbets or seats *e f*—the former to receive the male members or projections *g* of the hook, which, in conjunction with the seats *e* and pin *b*, form a swinging joint for said hook. The seats *f* are provided with curved side walls, *h*, and rear curved walls, *i*, which coincide with the curved sides *k* and ends *l* of the vertical projections *m* on the upper and lower sides of the hook B. The hook is provided with two arms, *n o*, at right angles to each other, the former having a slot, *p*, to receive a link of a coupling of that character, and a hole, *q*, to receive a pin for securing the link in position when coupled. The arm *o* is provided with an extension or projection, *r*, having a rearwardly and downwardly inclined surface, *s*, which engages with an angular slot, *t*, in an eccentric cam, C, mounted upon a shaft, D, and arranged transversely of the head of the draw-bar, as shown.

E indicates a skeleton brace-block, which may be cast or drop-forged, and is provided with a chamber or recess, *u*, in which the cam C is seated, and a recess, *v*, which receives the projection *r* of the hook B when the coupler is locked, as clearly shown in Figs. 5 and 6. The guard-block *d* may also be cast or forged, and the skeleton block and the guard-block may be secured to the upper and lower sides of the skeleton draw-bar frame by bolts *w* passing through them and headed on both sides, or they may be secured by welding them together.

The cam C is provided with a flat surface, *x*, upon which it rests normally, and to the outer end of the rod D is attached a weighted hand-lever, F, which, in conjunction with the eccentricity of the cam, causes the cam to set automatically upon its flat surface *x* after it has been tripped by the extension *r* of the hook to automatically hook the coupler, or after it has been raised by the hand-lever to uncouple.

On the inner surface of each half of the head of the draw-bar are lugs *a'*, which bear against the outer surface of one end of the skeleton brace-block to resist lateral strain upon the bolts *w* when two couplers are locked and the cars are in motion.

The construction being substantially as shown, the operation is as follows: The hooks B of two cars fitted with my improved coupler being set in the position shown in Fig. 4, as they approach each other the arm *n* of each hook will strike the arm *o* of the other hook and push it rearward, when the inclined surface *s* on the projection *r* will engage with the inclined groove *t* of the cam C and trip it. The projection *r* will then be seated in the recess *v*. The shock produced by the approaching cars will be received and resisted by the projections *m* on the hook and the curved walls *h i* of the draw-head and *k l* of the hook, thus relieving the excessive strain upon the pin *b*. When the cars are being drawn, it will be observed that the strain upon the hooks is transferred to their inner arms, o, and the projections r brought to bear against one end of the cam C, which in turn is pushed against one of the inner walls of the brace-block E, which in turn is supported by the lugs a' on the inner surfaces of the draw-head. To uncouple two cars, the lever of one of the couplers F is raised and the shaft D turned one-fourth of a revolution, which will raise the cam C out of engagement with the projection r and allow the hook to swing out of its coupled position. As soon as the lever F is released it will return by gravity to its normal position and put the cam in position again for automatic coupling.

To prevent coupling while shunting cars, the lever F is raised and secured by a chain, b', when the cam will be in the position shown in Fig. 3 and will not lock the coupler.

Having thus fully described my invention, what I claim is—

1. In a vertical-hook coupler, a rotary hook having a rearwardly-inclined surface, in combination with a cam arranged transversely of the draw-head, provided with an inclined groove, with which the incline on the hook engages for automatically locking the coupler, substantially as described.

2. In a vertical-hook coupler, a rotary hook having a rearwardly-inclined surface, in combination with an eccentric cam arranged transversely of the draw-head and provided with a flat side and an inclined groove, a shaft supporting said cam, and a weighted arm attached to said shaft, substantially as described.

3. In a vertical-hook coupler, a hook having projections, as g and m, on its sides, the latter having curved side and end surfaces, in combination with a draw-head having seats, as e and f, the latter having side and end walls corresponding with the projections m on the hook, substantially as described.

4. A forged skeleton draw-bar frame having a skeleton brace-block secured in its head, in combination with a rotary hook and a locking device, substantially as described.

5. A skeleton draw-bar frame having a skeleton brace-block in its head, the frame and block being secured by bolts, in combination with a rotary hook and an automatic locking device, substantially as described.

6. A skeleton draw-bar frame having laterally supporting lugs, in combination with a skeleton brace-block, a rotary hook, and a transverse locking-cam supported in a recess in the head, substantially as described.

In testimony whereof I affix my signature in presence of two witnesses.

JOHN T. WILSON.

Witnesses:
D. C. REINOHL,
WM. E. DYRE.